(12) United States Patent
Tsironis

(10) Patent No.: US 12,525,694 B1
(45) Date of Patent: Jan. 13, 2026

(54) TWO PROBE COMPACT SLIDE SCREW TUNER AND METHOD

(71) Applicant: Christos Tsironis, St-Laurent (CA)

(72) Inventor: Christos Tsironis, Kirkland (CA)

(*) Notice: Subject to any disclaimer, the term of this patent is extended or adjusted under 35 U.S.C. 154(b) by 448 days.

(21) Appl. No.: 17/829,756

(22) Filed: Jun. 1, 2022

(51) Int. Cl.
*H01P 3/02* (2006.01)

(52) U.S. Cl.
CPC ..................... *H01P 3/02* (2013.01)

(58) Field of Classification Search
CPC ...... H01P 5/04; H01P 1/00; H01P 5/18; H01P 1/182; G01R 31/2822; G01R 27/32; G01R 35/005; G01R 31/2601; G01R 31/2612; G01R 27/04; G01R 27/28; G01R 31/2614; G01R 1/26; G01R 27/06; G01R 31/3191; H03H 7/40; H03H 7/38; H03H 1/06; H03H 1/08; H03H 7/305
See application file for complete search history.

(56) References Cited

U.S. PATENT DOCUMENTS

| | | | |
|---|---|---|---|
| 5,910,754 | A | 6/1999 | Simpson et al. |
| 6,674,293 | B1 | 1/2004 | Tsironis |
| 8,188,816 | B1 * | 5/2012 | Tsironis .................... H01P 5/04 333/263 |
| 9,325,290 | B1 * | 4/2016 | Tsironis .................... H01P 5/04 |

OTHER PUBLICATIONS

"Load Pull Measurements" [online], Wikipedia [retrieved on Nov. 18, 2016] Retrieved from Internet <URL:http://en.wikipedia.org/wiki/Load_pull>.
"Computer Controlled Microwave Tuner, CCMT", Product Note 41, Focus Microwaves Inc. 1998.
"Signal-flow graph" [online], Wikipedia [retrieved on Aug. 31, 2021]. Retrieved from Internet <URL: https://en.wikipedia.org/wiki/Signal-flow_graph>.
"Linear Actuator" [online], Wikipedia [retrieved on Apr. 25, 2020]. Retrieved from Internet <URL: https://en.wikipedia.org/wiki/Linear_actuator>.

* cited by examiner

*Primary Examiner* — Lincoln D Donovan
*Assistant Examiner* — Tyler J Pereny

(57) ABSTRACT

A new two-probe slide screw load-pull tuner of which the probes share the same slabline section; they are inserted diametrically at fixed depth facing on opposite sides of the center conductor. The tuner does not have cumbersome adjustable vertical axes controlling the penetration of the probes and its low profile is optimized for on-wafer operations. The carriages holding the probes are moved along the slabline using electric stepper motors or linear actuators. The calibration uses mutual de-embedding of initialized probes and is 20 or more times faster than the full probe permutations calibration.

6 Claims, 11 Drawing Sheets

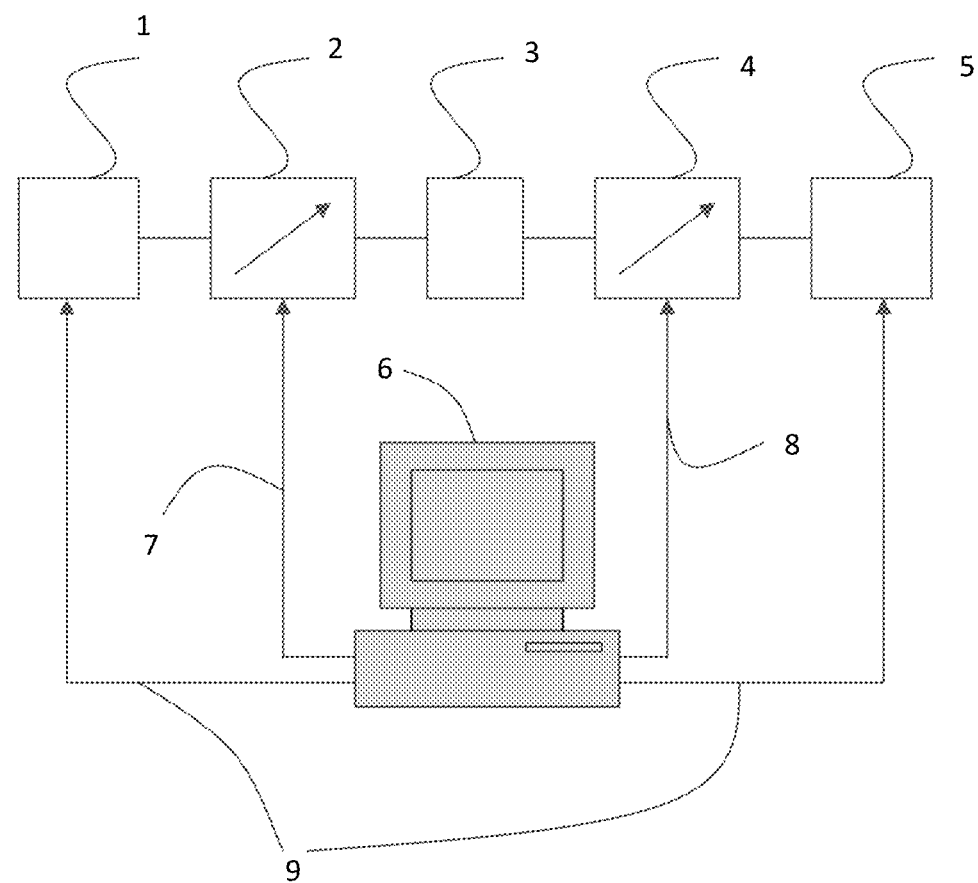
FIG. 1: Prior art

FIG. 2A: Prior art
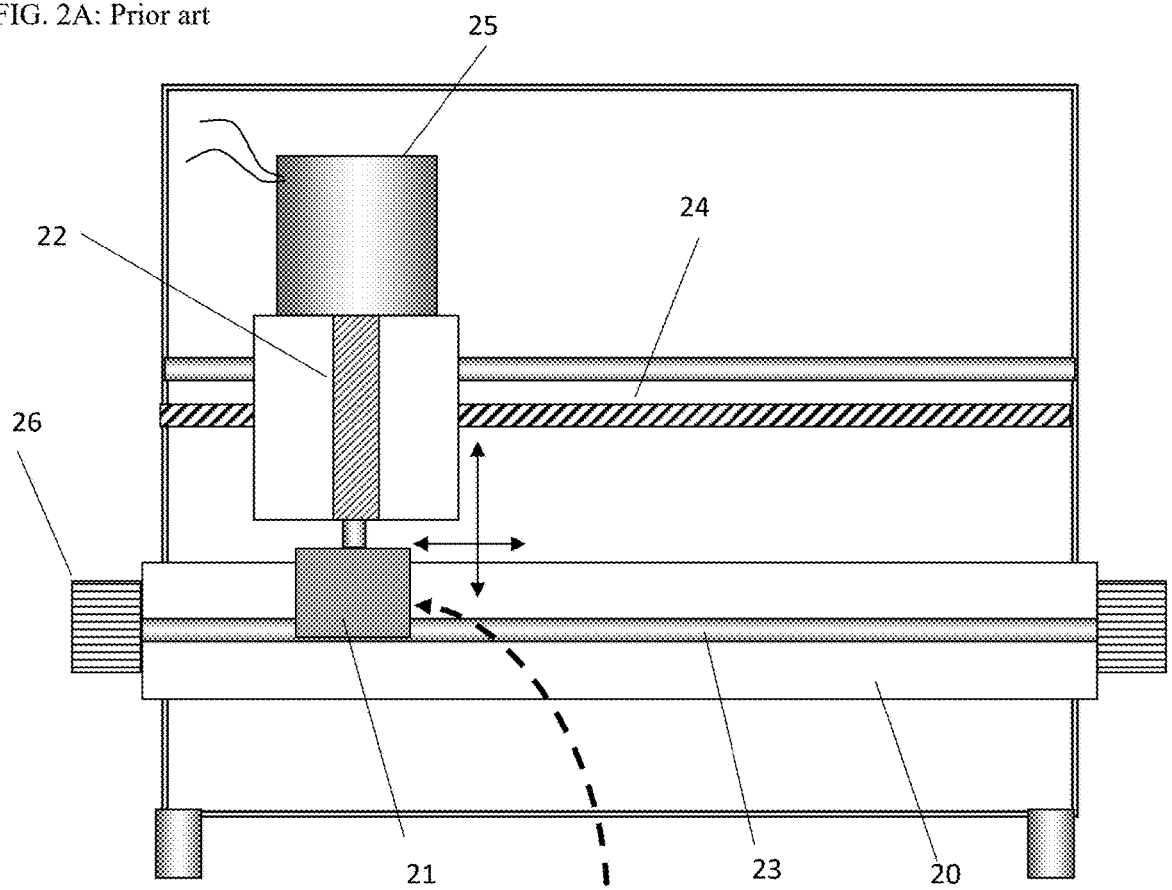
FIG. 2B: Prior art
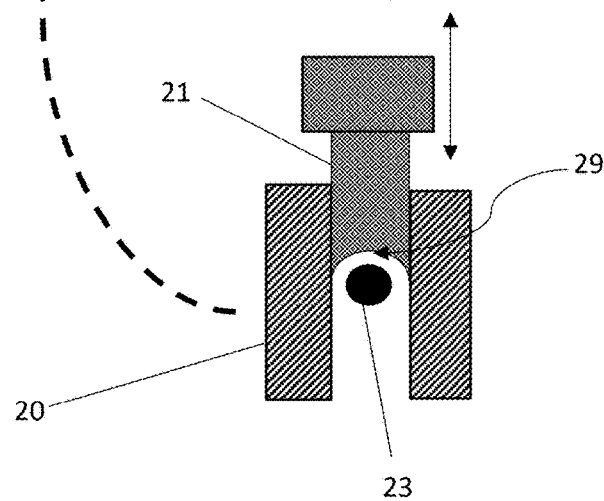

TWO PROBE COMPACT SLIDE SCREW TUNER AND METHOD

PRIORITY CLAIM

Not Applicable

CROSS-REFERENCE TO RELATED ARTICLES

1. "Load Pull Measurements" [online], Wikipedia [retrieved on Nov. 18, 2016] Retrieved from Internet <URL: http://en.wikipedia.org/wiki/Load_pull>
2. Computer controlled microwave tuner—CCMT, Product Note PN-41, Focus Microwaves January 1998.
3. Tsironis C., U.S. Pat. No. 6,674,293, "Adaptable Pre-Matched Tuner System and Method".
4. Simpson G. et al., U.S. Pat. No. 5,910,754, "Reduced height waveguide tuner for impedance matching".
5. "Signal-flow graph" [online], Wikipedia [retrieved on Aug. 31, 2021]. Retrieved from Internet <URL: https://en.wikipedia.org/wiki/Signal-flow_graph>.
6. "Linear Actuator" [online], Wikipedia [retrieved on Apr. 25, 2020]. Retrieved from Internet <URL: https://en.wikipedia.org/wiki/Linear_actuator>.

BACKGROUND OF THE INVENTION

This invention relates to load and source pull testing of RF and microwave transistors and amplifiers using remotely controlled electro-mechanical impedance tuners.

A popular method for testing and characterizing RF and microwave transistors in their non-linear region of operation is "load pull" (see ref. 1). Load pull is a device characterization technique employing automatic microwave impedance (load-pull) tuners and other microwave test equipment as shown in FIG. 1. The tuners 2, 4 (see ref. 2) are used in order to manipulate the microwave impedance conditions under which the Device Under Test (DUT, or transistor, 3) is tested; the stimulus test signal is provided by a signal source 1 and the out-coming power is measured by a power meter 5; the whole is controlled by a PC controller 6, which includes an electronic digital interface to communicate with the instruments 1, 5 and the tuners 2, 4 using control and communication cables 7, 8 and 9

DESCRIPTION OF PRIOR ART

Slide screw impedance tuners include, in general, a slotted low-loss transmission line 20 (typically a slabline, which includes two parallel conductive sidewalls forming a slot or air channel between them and a, typically, cylindrical center conductor), FIG. 2A, and a conductive tuning element (tuning probe, 21) inserted in the slabline slot; the probe 21 is a metallic slug with a concave bottom matching the contour of the center conductor 23 (FIG. 2B), attached to a complex, high precision, adjustable vertical axis 22, controlled by a stepper motor 25 or linear actuator (see ref. 6) and is inserted vertically into the slot of the slabline and is moved along the axis of the slabline using a gear such as an ACME screw 24; this movement of the tuning probe creates, in a certain frequency range, a controllable variable reactance which allows the synthesis of various impedances (or reflection factors) which are present at the test port 26, covering the quasi totality of the Smith chart (the polar impedance mapping display shown as normalized reflection factor, FIG. 3). The impedance synthesis using the tuning probe 21 follows a path 30, 31 between the matched load at the origin (50$\Omega$) and an arbitrary reflection factor TARGET-1. Inserting the tuning probe into the slot follows path 30 and moving it along the slot follows path 31. The relation between reflection factor $\Gamma$ and impedance Z is given by $\Gamma=(Z-Zo)/(Z+Zo)$, wherein $Z=R+jX$ and wherein Zo is the characteristic impedance. A typical value used for Zo is 50$\Omega$.

When conductive tuning probes 21, FIG. 2, penetrate into the slabline 20, they capture and deform the electric field, which is concentrated in the area 29 between the bottom surface of the probe 21 and the center conductor 23 of the slabline. This field deformation creates a capacitive effect, reflects injected signal power back, and allows generating high and controllable reflection factors. The main disadvantage of this embodiment is the requirement for high precision and resolution and, by consequence, tall and cumbersome vertical probe movement mechanisms 22, see ref. 4, and very precise, especially when the probe is at maximum depth, very close to the center conductor and over the entire travel range, because of a hyperbolic capacitive behavior, since the significant portion of reflection occurs when the probe bottom is very close to the center conductor of the slabline. This movement process slows down the tuning procedure for two reasons: (a) when the probe is withdrawn, the vertical movement is lengthy and much less effective in terms of generating useful reflection factor increments, and (b), because the vertical moving resolution is constant, enhanced positioning accuracy and resolution are required all the way due to high tuning sensitivity in the high reflection area, when the probe is deeply inserted and close to the center conductor.

Related prior art (see ref. 4) does not teach impedance tuners with two, fixed penetration (or vertical position), tuning probes; prior art tuners require at least one high precision cumbersome and complex vertical axis (FIG. 8 in ref. 4) to be able to create path 30-31 in FIG. 3 and tune. Neither relevant prior art ref. 3 or 4 teach a short tuner using alternatively swapping and crossing over tuning probes in a shared transmission line structure. The overlapping structure disclosed further down though, is essential and compatible with the proposed low profile, compact size tuner and attractive, because of high-speed adaptive tuner calibration and operation based on the basic calibration concept of ref. 3 but is not identical to it.

BRIEF SUMMARY OF THE INVENTION

The invention discloses a new type of load pull slide screw tuner and calibration and tuning procedures. The tuner uses, other than the totality of the prior art, horizontal-only high-speed movement mechanism of the tuning probes.

The impedance tuner itself, of which the concept is shown in FIGS. 6-8, uses a slotted low loss transmission line (slabline) 66, 72 and two diametrical tuning probes 63 and 65. The tuning probes 63, 65 are, typically, metallic, or at least partially conductive slugs and are mounted on mobile carriages 82, 82A and slide along the top and bottom frontages of the sidewalls 72 and 72A of the slabline 83. The carriages are placed facing each-other across the channel 67 of the slabline and slide seamlessly and precisely along the top and bottom walls guided by high precision sliders. The carriages 82 and 82A hold the tuning probes (slugs) 81, 81A and keep them inserted into the slabline channel cavity at a fixed distance from the center conductor 86. This tuning mechanism does not require a vertical probe control. In order to allow the tuning probes a) to create a sizeable capacitance against the center conductor and b) to cross over without mechanical conflict, the conductive tuning slugs have a concave bottom that does not cover entirely half of the center conductor, i.e., the height 74 of the concave cavity is slightly less than the radius of the cylindrical center conductor. A medium size reflection 62, 64 (S11≈0.5-0.7) is created by either tuning probe leading to the different tuning mechanism as shown in FIG. 3 (path 32, 33) and FIG. 4. Both tuning paths 30-31 and 32-33 shown in FIG. 3 yield the same tuning objective: starting from the matched load (50Ω) they allow tuning to TARGETS-1 or -2. The result is the same, only the synthesis mechanisms differ.

The carriages 82 and 82A are controlled using high-speed electric stepper motors 85, and 85A and ACME rods 84 and 84A or linear actuators (see ref. 6) thus eliminating additional control gear. Last, not least, the tuning mechanism, liberated from cumbersome and expensive high resolution vertical probe control and movement delays, benefits also from inherent lower tuning error sensitivity to mechanical probe positioning tolerances close to |Γ|≈1, because the horizontal step of the tuning probe control is always the same.

BRIEF DESCRIPTION OF THE SEVERAL VIEWS OF THE DRAWINGS

The invention and its mode of operation will be better understood from the following detailed description when read with the appended drawings, in which:

FIG. 1 depicts prior art: a typical generic automated load pull test system.

FIGS. 2A through 2B depict prior art: a single probe slide screw impedance tuner;

FIG. 2A depicts a front view of the entire tuner; FIG. 2B depicts a cross section of the tuning probe (typically a slug with concave bottom) entering the slabline.

FIG. 5A depicts the probes far from each-other; FIG. 5B depicts the probes close to each-other entering mutual electromagnetic fields; FIG. 5C depicts the two probes partially or fully overlapping.

DETAILED DESCRIPTION OF THE INVENTION

Figure 6:
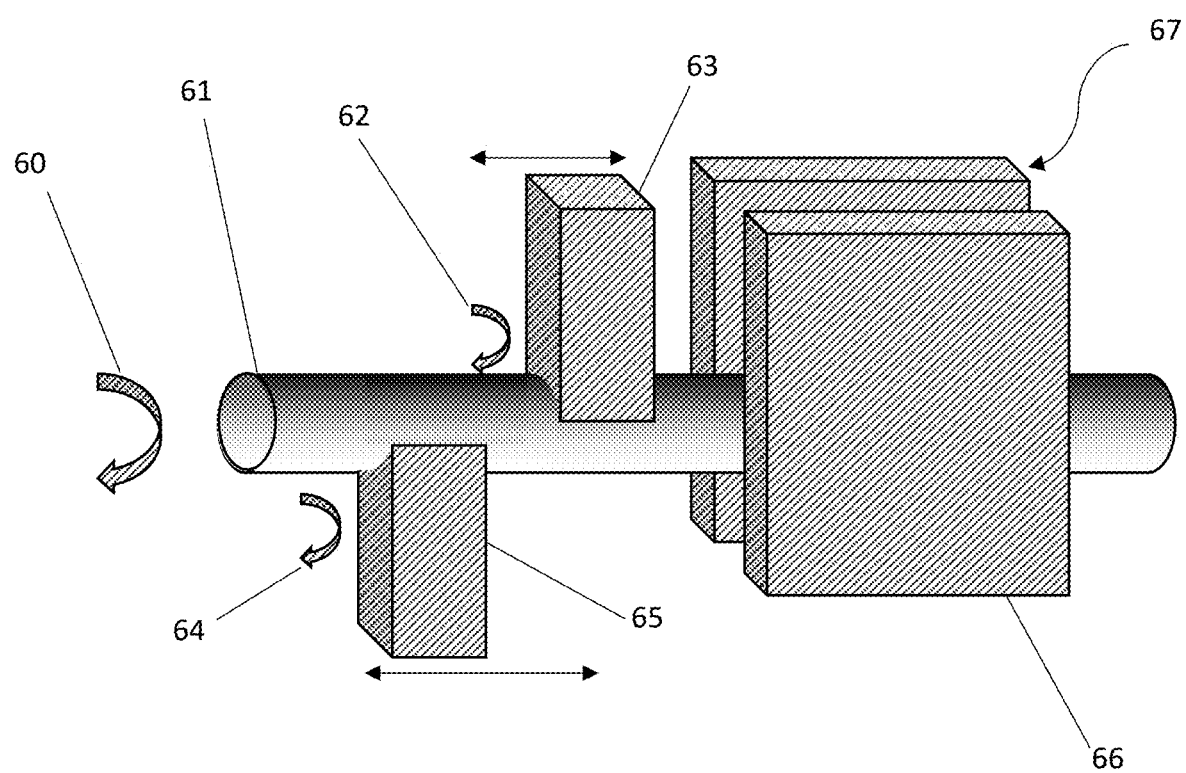
FIG. 6 depicts a perspective view of the two diametrical probes inserted inside the slabline.

This invention discloses a high frequency (RF, microwave, millimeter wave), computer-controlled impedance tuner, suitable for load pull measurements. The tuner (FIG. 6) uses a low loss slabline, which includes two broad conductive sidewalls 66, 67 and a center conductor 61. Two tuning probes (conductive slugs) 63, 65 are inserted into the cavity between the sidewalls and moved only along the center conductor at fixed penetration (keeping the same gap between them and the center conductor). This leads to similar or equal capacitance between the slugs 63 and 65 and the center conductor 61, leading to similar or equal signal reflections 64 and 62; the overall reflection 60 is the sum of the two reflections 62 and 64 transformed by the transmission line to the tuner test port 80.

Figure 3:
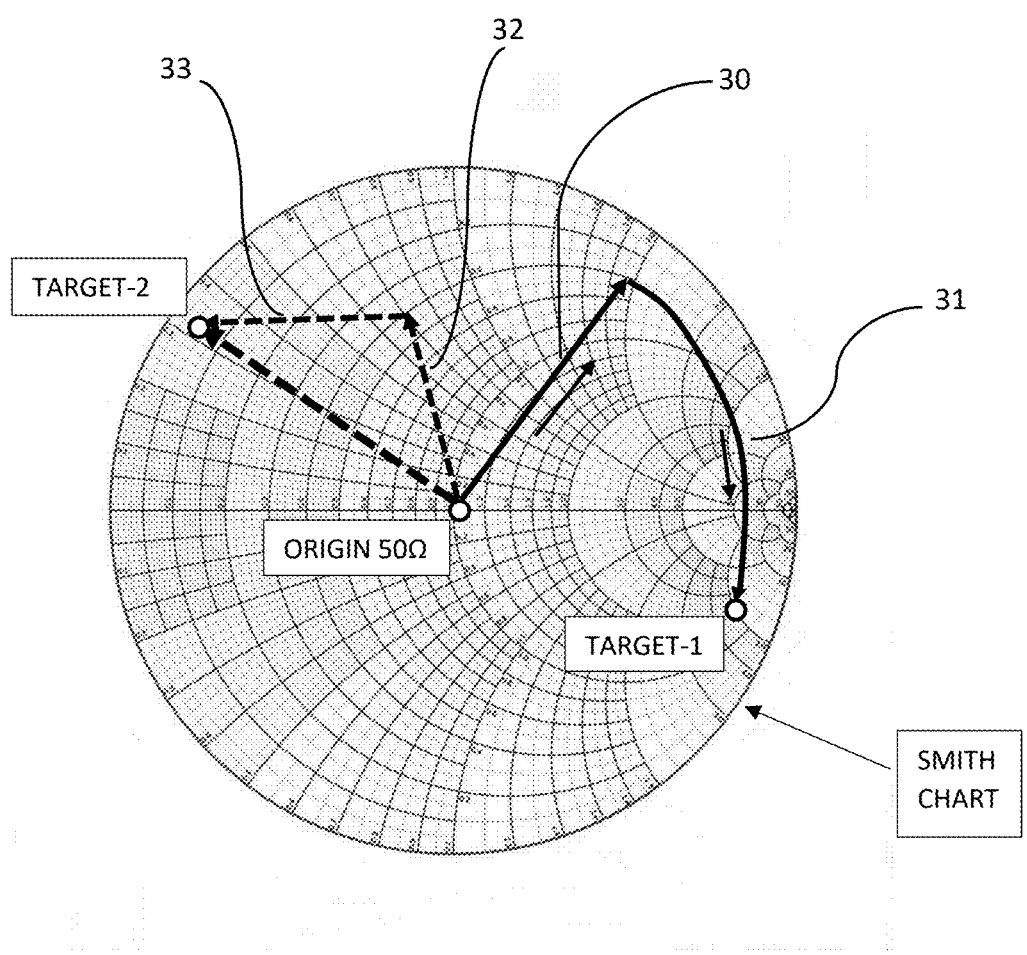
FIG. 3 depicts partly prior art: a Smith chart and two possible trajectories of impedance synthesis (tuning) to reach a target impedance starting from the origin of 501. Reaching TARGET-1 uses the prior art single-probe technique with horizontal and vertical control; reaching TARGET-2 uses the new two-probe method with horizontal-only and without vertical control.
Figure 4:
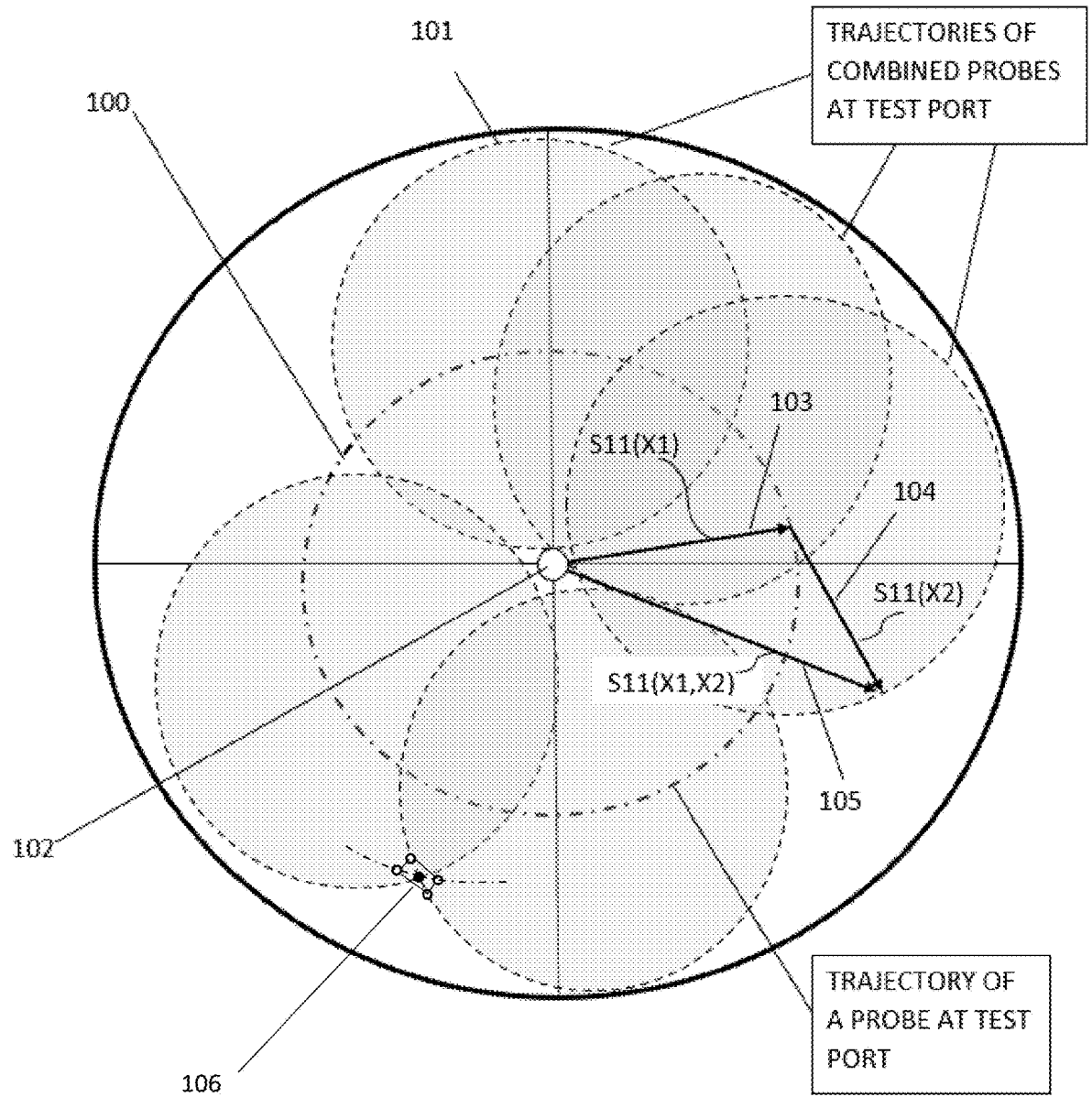
FIG. 4 depicts the impedance synthesis on the Smith chart using the two-probe impedance tuner with fixed probe insertion depth.

The overall behavior of the tuner is demonstrated in FIG. 4: the plot shows the reflection factor vectors referred to (as they appear at) the test port 80: the tuning probe closest to the test port (let's assume this to be probe 1) creates, as it moves along the slabline, a circle 100 around the center 102; the tuning probe 2 is also movable along the slabline and around a fixed position of probe 1 creating a trace 101. At each position of the first probe the second probe creates also a circle around the specific point of the first circle of the first probe at position X1; when both probes move this creates a Lissajous contour similar to the number 8; every point on the Smith chart is created by the vector sum of reflections S11(X1) 103 and S11(X2) 104; in fact, the total reflection depends on both X1 and X2: S11(X1,X2) 105.

Figure 5A:
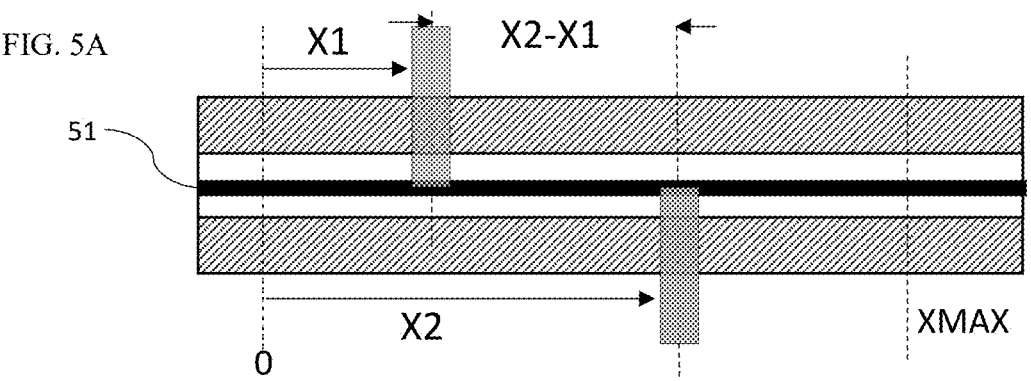
FIGS. 5A through 5C depict possible relative positions of the two tuning probes.
Figure 5B:
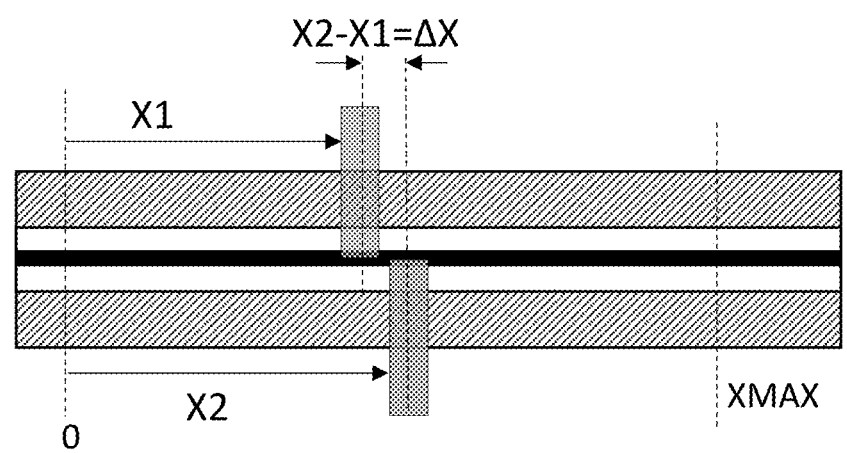
Figure 5C:
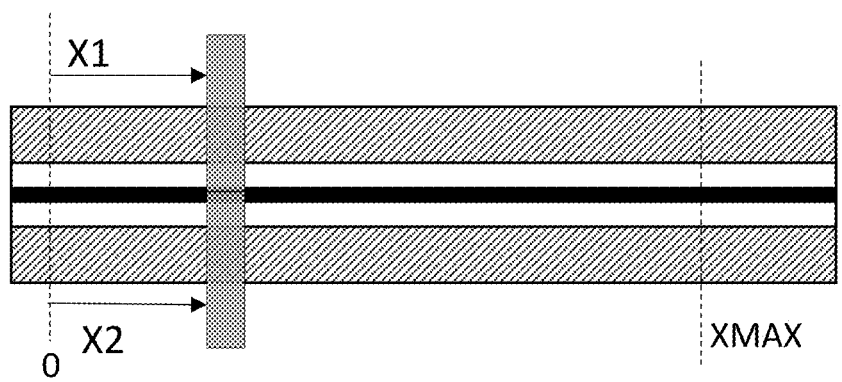

Other than the two-probe tuners in prior art, though (see ref. 3), where the tuning probes are inserted in-line, one after the other in the airline, in the present invention the tuning probes share the same section of the airline; during the tuning process probe 1 can be closer to the test port 51, if X1<X2, or further away, if X1<X2, as can be seen in FIG. 5A: the tuning probes can come close to each-other as seen in FIG. 5B, or even overlap as shown in FIG. 5C; when the tuning probes are close it is assumed that they interfere mutually in each-other's electro-magnetic field and affect each-other's behavior. This affects critically the high-speed de-embedding calibration used in this invention. In a situation of mutual interference between the tuning probes it is impossible to mathematically cascade the s-parameters of each probe on its own. The s-parameters must be measured of both probes in-situ. The procedure is described below in the calibration method.

Figure 7:
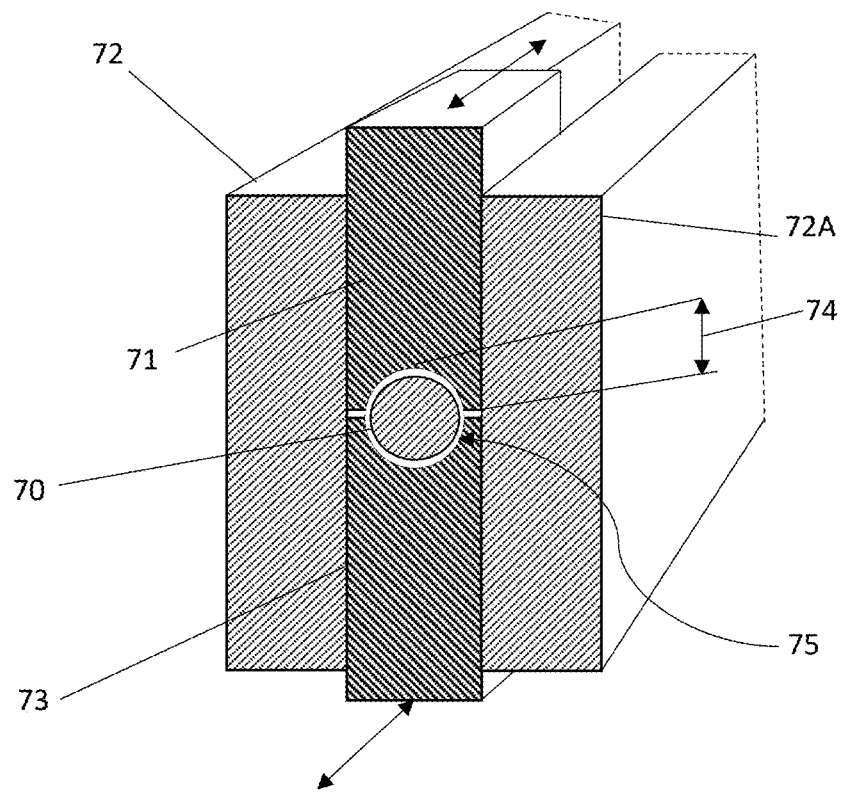
FIG. 7 depicts a perspective cross section of the tuner when the tuning probes overlap.
Figure 8:
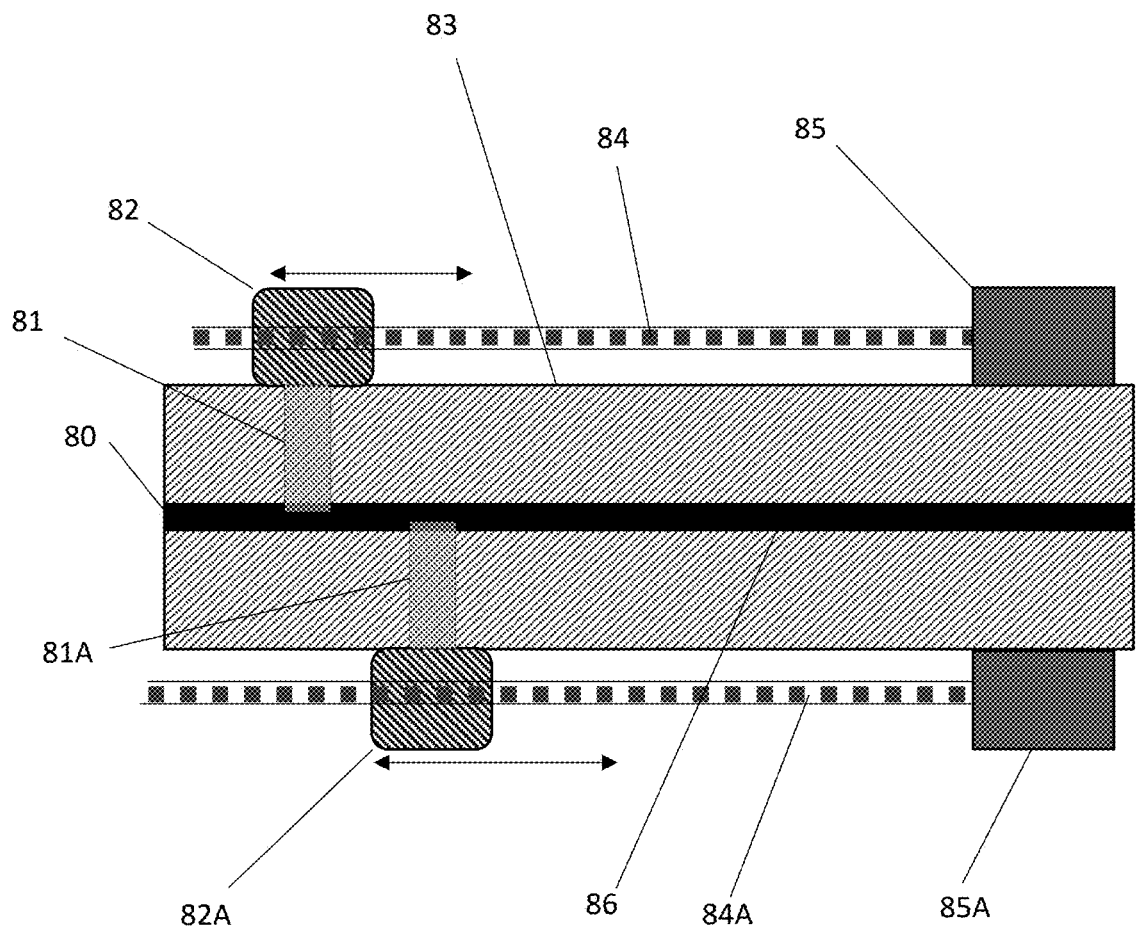
FIG. 8 depicts the two-probe slide screw tuner control mechanics.

FIGS. 5A to 5C show a schematic front view of the tuner and three possible positions of the tuning probes versus one another; if the probes are far from each-other (FIG. 5A) it is assumed that their reflections do not affect each-other; when they are close (FIG. 5B) and, depending on the calibration step ΔX=|X1−X2|, it can be assumed that their reflection is mutually affected; the same when they, more or less face each-other on opposite sides of the center conductor (FIGS. 5C and 7). In FIG. 5A it is also clear that the horizontal coordinates X1, X2 can be defined arbitrarily, but must describe the situation of probe 1 or 2 being closer to the test port 51 or not. FIG. 7 shows the two tuning probes 71 and 73 in closest proximity overlapping across the center conductor 70.

The total reflection factor 105 (FIG. 4) is the sum of all internal reflections in the waveguide and a function of the positions X1 and X2 of the two probes: S11(X1,X2) and is the vector-sum of the reflection factors 103 and 104 of both probes S11(X1) and S11(X2): S11(X1,X2)=S11(X1)+S11(X2), all referenced at the test port 80. The tuning probe 81 closest to the test port generates the primary reflection 100 i.e., S11(X1), 103. Since the reflection of the first probe 81 is selected not to be maximum (i.e. <0.8), but is, instead, selected to have medium value |S11(X1)|≈0.5-0.7, there is a signal portion traversing probe 81 towards the secondary probe 81A; this signal portion is then reflected back towards the primary probe 81; again, a portion of this reflected back signal traverses the primary probe towards the test port and adds to the total reflection. The signal reflected at the secondary probe 81A is also reflected back at the primary probe 81, and so on . . . creating the phenomenon of a multiple reflection. In mechanical terms this appears like a turbulence. This back and forth bouncing of signal is well described using signal flow graphs (see ref. 5). Instead, since the tuner is normally terminated with a matched load any escaping signal is not reflected back and therefore ignored.

FIG. 4 depicts schematically the overall reflection factor synthesis mechanism: each probe creates at its own reference plane reflections $\Gamma_1$ or $\Gamma_2$, which are concentric reflection factor circles represented at test port reference plane as trace 100 on the Smith chart (FIG. 4). The total reflection factor trace 101 is created by a planetary epicycloid superposition of the two reflection factor vectors around the center 102 (one circle rotates around a point on the periphery of the other). When the probes cross-over the circles swap: circle 100 is now created by probe 2 and circle 101 by probe 1. The total reflection factor vector 105 is created by the vector sum of vector 103 (from the first probe) and the vector 104 (from the second vector) as described above.

To be used in impedance synthesis the tuner must be calibrated and the calibration data must be used to generate the proper probe positions to reach a TARGET impedance. To create a reasonable accuracy each probe of the tuner must be characterized at least at 100 positions between X=0 and X=XMAX=$\lambda$/2; in terms of a typical circular trajectory 100 (FIG. 4) this corresponds to phase steps of 3.6°. At 50 GHz the wavelength $\lambda$=6 mm and this leads to mechanical steps of 0.03 mm. To calibrate all 100×100=10,000 tuner states (calibration points) one would need at least 10,000 seconds or 2.8 hours, at 1 second per point, including mechanical probe movement and instrument triggering and reading. The new method disclosed here allows reducing this time to approximately 8.4 minutes.

Figure 9:
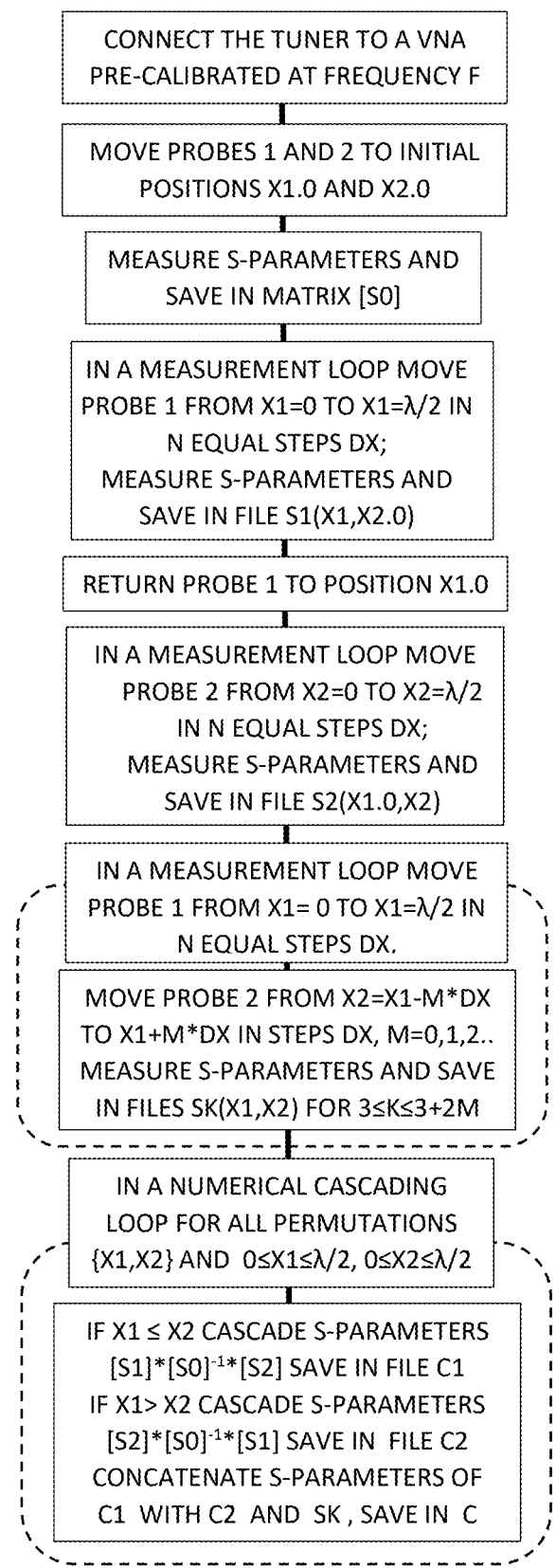
FIG. 9 depicts the tuner calibration flow-chart.
Figure 10:
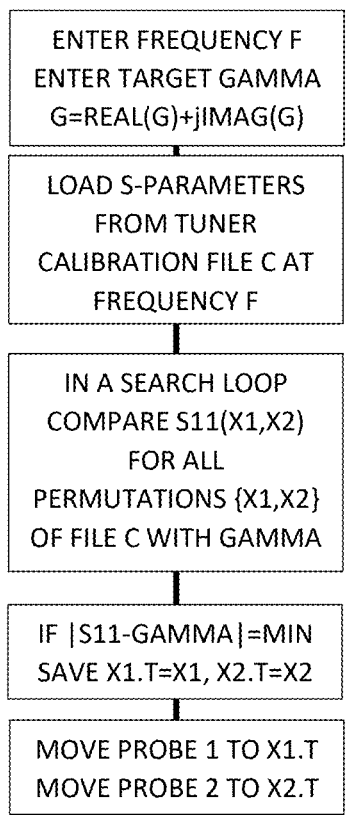
FIG. 10 depicts the impedance synthesis flow-chart.

The calibration procedure executes as follows (FIG. 9): The tuner is connected to a pre-calibrated vector network analyzer (VNA); then the two probes are placed to initial positions, for instance probe 1 at X1=X1.0=0 and probe 2 at X2=X2.0=XMAX=$\lambda$/2; then scattering (s-) parameters are measured and saved in a init matrix [S0]; then, in a first measurement loop probe 1 is moved in a number N (typically 100) of steps $\Delta$X from X1=0 to X1=XMAX and s-parameters are measured and saved in a matrix [S1]=[S(X1,X2.0)] containing 4 sets of two-port s-parameters. In a next measurement loop probe 1 is returned to its initial position X1.0 and probe 2 is moved from X2=0 to X2=XMAX and s-parameters are measured and saved in a matrix [S2]=[S(X1.0,X2)]. The total data are saved in data files S1 and S2 comprising N sets of s-parameters each. In real tuning, though, there will be situations where the two probes will be near each-other or even overlap (FIG. 5B-5C). If we define "near" as the positioning of a probe at least one step ahead of and one step beyond the other probe, then we have a total of at least three positions where one probe affects the other, so a total of at least 3N positions; a third measurement loop is then, necessary in the simplest scenario, as follows: Probe 1 moves from X1=0 to X1=XMAX in N steps of length $\Delta$X=$\lambda$/(2N); then probe 2 moves to three positions, one ahead, one opposite and one after probe 1: X2=X1-$\Delta$X, X2=X1 and X2=X1+$\Delta$X, and each time we measure s-parameters and save in matrices [S3]=[S(X1,X1-$\Delta$X)], [S4]=[S(X1,X1)] and [S5]=[S(X1, X1+$\Delta$X)]; the totality of these measurements are saved in data files S3 to S5 etc., comprising N sets of s-parameters each. This makes for a total of 2N+3N=5N measurements, instead of $N^2$ measurements, a time reduction of $N^2$/(5N) =N/5; in the case of N=100 the new calibration method is 20 times faster. In the case of N=200 and two adjacent calibration points, allowing to increase the calibration density and cross-over accuracy, the time improvement ratio becomes $N^2$/(7N)≈29.

In a next step the hitherto measured calibration data of the individual probes are used to generate the tuner calibration file as follows: for all X1, X2 permutations, symbolized as {X1,X2}, except for the probe-interacting or -overlapping cases, where X1−$\Delta$X≤X2≤X1+$\Delta$X, the matrices [S1], [S2] and [S0] are cascaded as follows: if X1≤X2, cascade [S1] *[S0]$^{-1}$*[S2] and save in a first portion of the tuner calibration file C1; if X1>X2, cascade [S2]*[S0]$^{-1}$*[S1] and save in a second portion of the tuner calibration file C2. In a final step, insert the s-parameter data matrices [S3], [S4] and [S5] into, and replace, the concatenated s-parameter data of C1 and C2 to create the overall calibration file C. Or, the s-parameter data in file C include sets of tuner s-parameters between the input or tuner test port and the output port for all $N^2$ permutations of X1 and X2 positions every $\Delta$X=$\lambda$/ (2N) steps including: ($N^2$−3N) cascaded and de-embedded s-parameters of the individual probes and 3N directly measured s-parameter sets of probes overlapping or in proximity. In the case of 5 or more directly measured overlapping and adjacent points this number becomes $N^2$−5N, $N^2$−7N etc . . . .

Figure 11:
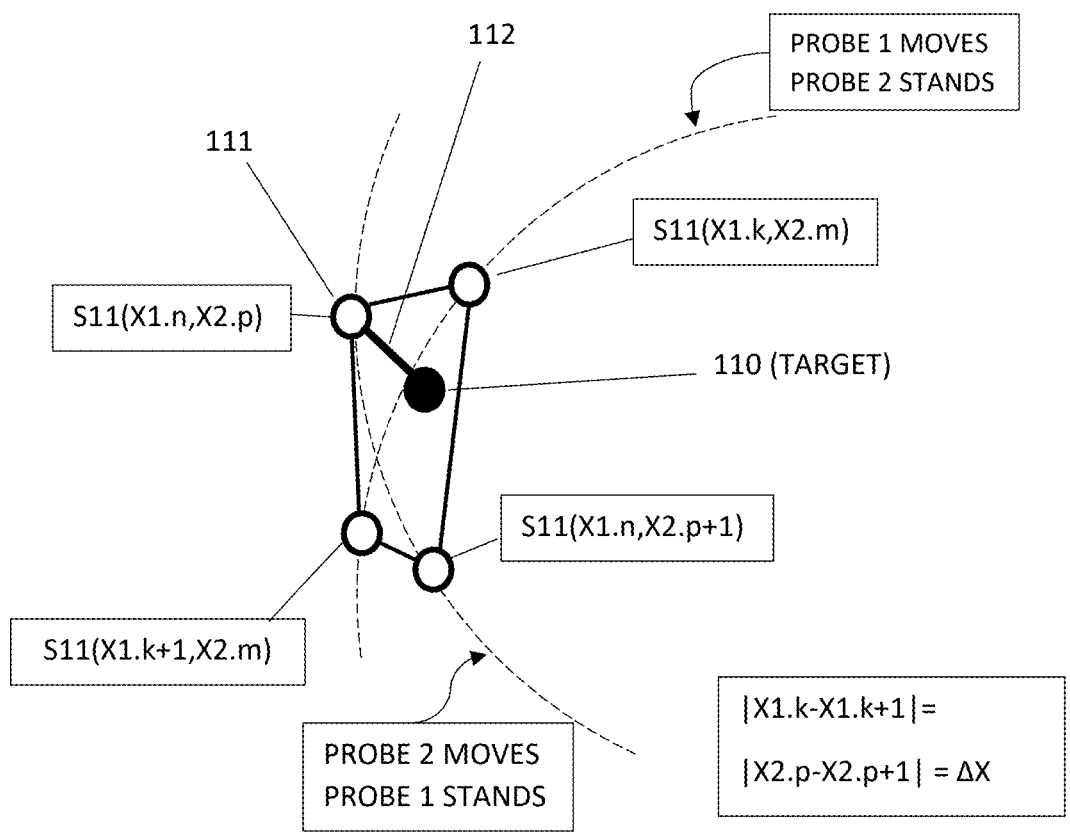
FIG. 11 depicts a TARGET reflection factor inside a calibration trapezoid ("pixel").

Tuning is the procedure of synthesizing a TARGET reflection factor using the calibrated tuner, i.e., determining the best probe positions X1, X2 that create a desired reflection factor 110 (FIG. 11). Tuning accuracy is the vector difference 112 between the user-defined target reflection factor 110 and the closest synthesized calibration point 111. Assuming the tuner is calibrated at 100×100=10,000 settings (X1, X2): in a first rough approximation, on the Smith chart with a radius of 1 having a surface of $\pi$, the average size of each pixel is $\pi/10^4$ and, in a worst case scenario, as shown in FIG. 11 or area 106 in FIG. 4, if a target is in the center of a contour defined by the surrounding pixel (four calibrated points), the possible error, i.e., the difference of the closest calibrated point from the target is 20 log(sqrt($\pi$/2) *$10^{-2}$))≈−38 dB; in this case tuning is a simple search through the data points vector S11(X1,X2) of the calibration file C using an error function EF=|TARGET−S11| to minimize. This search could use optimized searching Real(S11) and Imag(S11) separately and should not last more than a few milliseconds. If the accuracy of −38 dB seems too coarse, then the number of calibrated points could be increased to 150 or 200 per axis with, still reasonable, calibration time and reach accuracies of 20 log(sqrt($\pi$/2)/ 3*$10^{-2}$))≈−41 dB or 20 log(sqrt($\pi$/(2)/4*$10^{-2}$))≈−44 dB etc. Even if every doubling of the number of horizontal steps doubles the, already inherently low, calibration time, it increases the accuracy by at least 6 dB If the number N of calibration steps per tuning probe increases, in order to enhance the tuning accuracy, it is possible that the interaction between probes spreads to more than plus and minus one step beyond overlapping and mutual interfering. This is not probable, because the electric field is concentrated at the closest point 75 in FIGS. 7 and 29 in FIG. 2 between the capacitive tuning probe and the center conductor, but, depending on the number N and the step size $\Delta$X=$\lambda$/(2N) it cannot be excluded. In this case the number of calibration points before and after the probe overlapping (FIG. 5C) should be increased to ±2, or ±3. In this case the calibration time increases as well, but the calibration procedure remains the same, as does the tuning algorithm.

Obvious alternative embodiments of fixed penetration tuning probes, diametrically inserted into and sharing the same slabline of slide screw impedance tuners and associated calibration and tuning methods shall not impede on the core idea of the present invention.

What is claimed is:

1. A calibration method and an impedance synthesis (tuning) method for a double, fixed penetration diametrical probe, load pull tuner,
   wherein the double, fixed penetration diametrical probe, load pull tuner comprises:
     a slabline having a test port and an idle port linked using a center conductor and two remotely controlled mobile carriages CAR #1 and CAR #2, mounted facing each-other across the slabline and sliding along the slabline, the carriage CAR #1 holding a reflective tuning probe P #1 and the carriage CAR #2 holding a reflective tuning probe P #2, wherein the said tuning probes are inserted diametrically into the slabline, are kept at fixed distance from the center conductor and may cross over;
   and wherein
     the carriage CAR #1 moves the reflective tuning probe P #1 to a first horizontal position X1 distant from the test port, and the carriage CAR #2 moves the reflective tuning probe P #2 to a second horizontal position X2 distant from the test port, wherein X1 may be smaller, equal or larger than X2;
   and wherein
   the said calibration method comprises the following steps:
     a) connect the load pull tuner to a VNA pre-calibrated at a frequency F;
     b) move the reflective tuning probes P #1 and P #2 to initial horizontal reference positions X1.0 and X2.0=X1.0 distant from the test port;
     c) measure s-parameters Sij(X1.0,X2.0) of the load pull tuner and save in an init matrix [S0], with $\{i,j\}=\{1,2\}$;
     d) in a first move-measurement loop:
        d1) move the reflective tuning probe P #1 from the horizontal position X1=X1.0 to at least horizontal position X1=X1.0+$\lambda$/2 in N incremental steps of $\Delta X=\lambda/(2N)$, wherein $\lambda$ is the wavelength at the frequency F;
        d2) after each move of the reflective tuning probe P #1 measure s-parameters Sij(X1, X2.0), with $\{i,j\}=\{1,2\}$, of the load pull tuner and save N+1 sets of s-parameters Sij in a file S1;
     e) return the reflective tuning probe P #1 to the horizontal position X1=X1.0;
     f) in a second move-measurement loop:
        f1) move the reflective tuning probe P #2 from the horizontal position X2=X2.0 to at least horizontal position X2=X2.0+$\lambda$/2 in N incremental steps of $\Delta X=\lambda/(2N)$;
        f2) after each move of the reflective tuning probe P #2 measure s-parameters Sij(X1.0, X2), with $\{i,j\}=\{1,2\}$, of the load pull tuner and save N+1 sets of s-parameters Sij in a file S2;
     g) in a third move-measurement loop:
        g1) move the reflective tuning probe P #1 from the horizontal position X1=X1.0 to at least horizontal position X1=X1.0+$\lambda$/2 in N incremental steps of $\Delta X=\lambda/(2N)$, and
        in a nested move-measurement loop for M=0, or M=1, or M=2, or M=3 . . . :
          g1.1) move the reflective tuning probe P #2 from a horizontal position X2=X1−M*$\Delta X$ to X2=X1+M*$\Delta X$ in 2M+1 incremental steps of $\Delta X=\lambda/(2N)$;
          g1.2) after each move of the reflective tuning probe P #2, measure s-parameters Sij(X1, X2), with $\{i,j\}=\{1,2\}$, and save 2M+1 sets of s-parameters in N+1 files S.X1.M;
     h) in a numerical processing loop for all horizontal position permutations $\{X1, X2\}$:
        if the distance X1 from the test port is less than or equal to the distance X2 from the test port: cascade s-parameter matrices $[S1]*[S0]^{-1}*[S2]$ and save in a file C1;
        if the distance X1 from the test port is larger than the distance X2 from the test port: cascade s-parameter matrices $[S2]*[S0]^{-1}*[S1]$ and save in a file C2;
     i) concatenate the s-parameters of the files C1 with the s-parameters of the file C2, replace the concatenated s-parameters with corresponding directly measured s-parameter data at the same (X1,X2) combinations from the files S.X1.M and save the s-parameters Sij(X1,X2) in a load pull tuner calibration file C.M(F), and wherein the impedance synthesis (tuning) method comprises using calibration data to synthesize a target impedance.

2. The impedance synthesis (tuning) method for the double, fixed penetration diametrical probe load pull tuner of claim 1 at the frequency F comprising the following steps:
   a) retrieve s-parameters Sij(X1,X2) with $\{i,j\}=\{1,2\}$, from the tuner calibration file C.M(F) and place in memory;
   b) enter a target reflection factor $\Gamma$ (Gamma)=Re($\Gamma$)+jIm ($\Gamma$);
   c) in a search loop for all permutations of horizontal positions $\{X1,X2\}$:
      c1) determine a difference D(X1,X2)=|S11(X1,X2)−$\Gamma$|;
      c2) save $(N+1)^2$ values D(X1,X2) in a file DF;
   d) search in the file DF for the smallest value D(X1,X2);
   e) save a first horizontal positions X1.T=X1, and a second horizontal position X2.T=X2;
   f) move the reflective tuning probe P #1 to the first horizontal position X1.T and the reflective tuning probe P #2 to the second horizontal position X2.T.

3. The double, fixed penetration diametrical probe load pull tuner of claim 1,
   wherein
     the mobile carriages are remotely controlled using electrical stepper motors and appropriate gear.

4. The double, fixed penetration diametrical probe load pull tuner of claim 1,
   wherein
     the center conductor of the slabline is cylindrical.

5. The double, fixed penetration diametrical probe load pull tuner of claim 4,
   wherein
     the reflective tuning probes are conductive slugs having a concave bottom surface facing and matching the cylindrical center conductor of the slabline.

6. The double, fixed penetration diametrical probe load pull tuner of claim 1,
   wherein
      the slabline is at least one half of a wavelength ($\lambda/2$) long at a minimum frequency of operation (Fmin).

\* \* \* \* \*